UNITED STATES PATENT OFFICE.

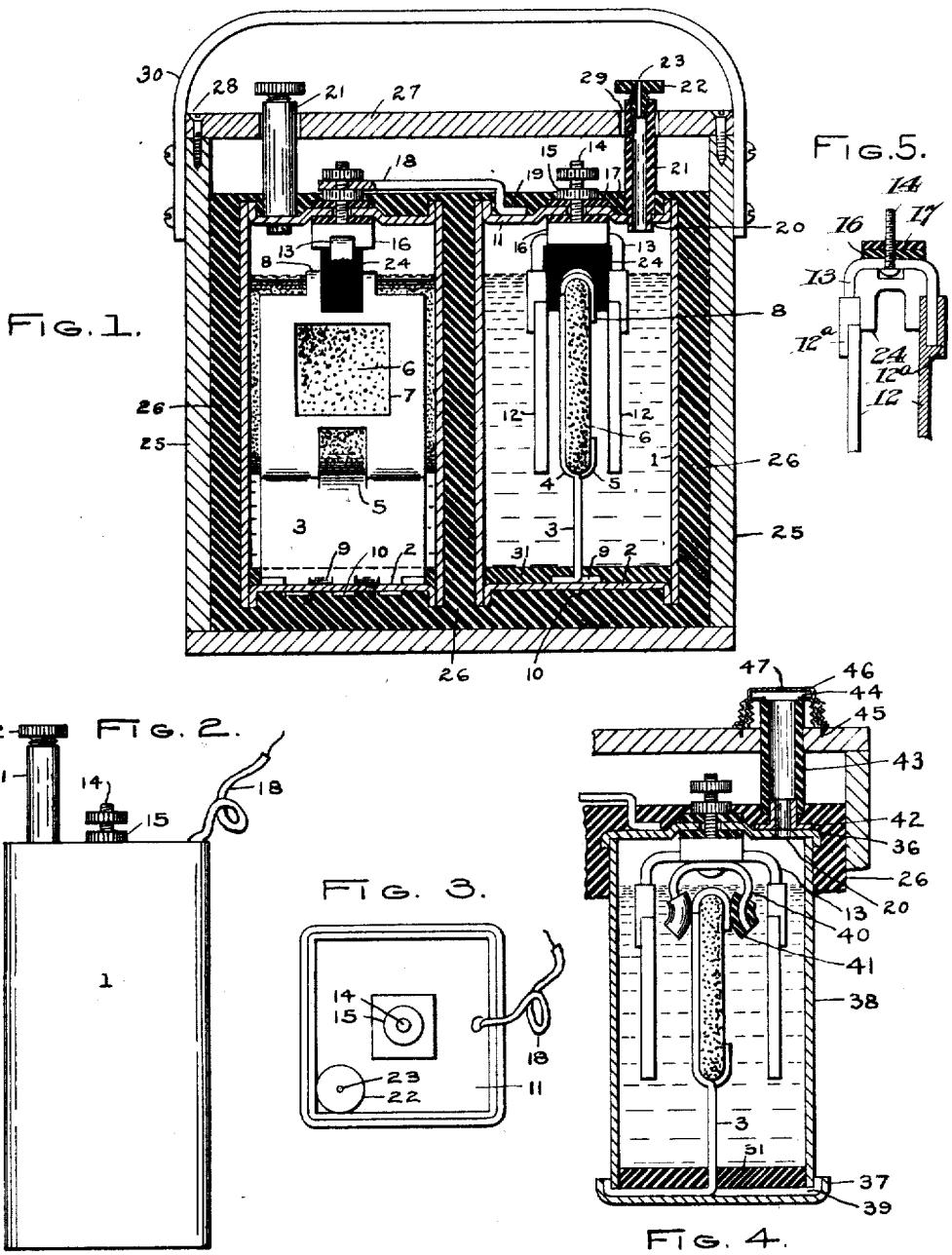

WILLIAM M. BRODIE, OF EAST ORANGE, NEW JERSEY.

PRIMARY BATTERY.

933,525.

Specification of Letters Patent.  Patented Sept. 7, 1909.

Application filed April 7, 1909.  Serial No. 488,462.

*To all whom it may concern:*

Be it known that I, WILLIAM M. BRODIE, a citizen of the United States, residing at East Orange, in the county of Essex and State of New Jersey, have invented certain new and useful Improvements in Primary Batteries, of which the following is a full, clear, and exact description, such as will enable others skilled in the art to which it pertains to make and use the same.

My invention relates to batteries in which two elements are used in an exciting fluid in which one of the elements is electro-positive in relation to the other.

The principal object of my invention is to cheapen and simplify the construction of such batteries, and this I accomplish by providing the battery cell with resilient supports for the elements.

A further object is to so assemble the parts that the battery will more readily stand the shock and jar of portable use without serious damage to the elements.

It has been found in practice that when the ordinary batteries are used on automobiles and other machines where there is a continuous vibration when the machine is in operation, the battery elements are likely to be fractured or dislodged before they are entirely used up. My construction tends to prevent trouble of this kind and hence reduces the cost of operation.

In using the ordinary battery, the expense of renewals is considerable and the renewed battery is usually not as efficient as a new battery. With my cheapened and improved construction, the entire battery can be thrown away when exhausted and a new battery substituted at about the expense of ordinary renewals.

In carrying out my invention, I make use of the construction illustrated in the accompanying drawings, in which—

Figure 1 illustrates a sectional elevation of two cells and the containing case, the zinc in one cell being broken away. Fig. 2 illustrates a single cell. Fig. 3 is a top plan view of the same; and Fig. 4 illustrates a modified construction. Fig. 5 is a sectional view of the zinc supports.

Similar letters of reference refer to like parts throughout the specification and drawings.

The cell jar is made of sheet metal which will not be acted upon by the exciting solution used, but in the "copper oxid" type of battery, I prefer to use sheet iron or steel. The cell body 1 together with the bottom 2 may be formed or drawn as one piece, but I find it cheaper to form the parts from flat sheet stock and weld them together by means of the oxygen-acetylene flame or other suitable appliance. To the bottom of the cell jar is welded the upstanding strip of sheet iron or steel 3 which is bent out of line at 4, and has the tongue 5 struck out and bent in the opposite direction to form a retaining clip or pocket for the copper oxid plate 6. The metal strip 3 is perforated as at 7 to allow free access of the exciting liquid to the oxid plate. The upper end of the strip 3 has extending therefrom, a tongue piece 8 which is bent over the top edge of the oxid plate 6 and holds it in place. The lower edge of the strip 3 is provided with wing brace flanges 9, and tongues 10 which pass through corresponding slots in the bottom 2 and are welded thereto. It will be seen that this structure forms a resilient mounting for the copper oxid plate 6, which will absorb much of the jar of sudden shocks and prevent fracture of the plate. The top 11 of the cell is inserted and welded in place after the zinc plates 12 have been suspended therefrom. The zinc plates 12 are united in any suitable manner, but as here shown, they are connected by the ∩-shaped strip 13 and suspended from the top 11 by the bolt 14 which passes through the strip 13. In practice, this strip 13 is placed in a mold and the zinc plates are cast above the ends of the strip 13 as shown, the enlargement 12ª being for the purpose of adding strength to the connection. The bolt 14 is secured by the usual nut 15 and serves as a binding post in the usual way. The top 11 being of metal, the zinc connecting strip 13 and bolt 14 must be insulated therefrom. This may be done by inserting between these parts, a block of insulating material 16 in the usual manner; but to make the mounting resilient and shock absorbing, I insert washers 17 of rubber or other suitable material on one or both sides of the thin metal top 11 and between the block 16 and the nut 15. The hole for the passage of the bolt 14 through the top 11 is made large enough to prevent contact of the bolt with the edge of the hole and will be held in a central position by the compressible washers 17. The body, top and bottom of the cell and the strip 3 being welded together, they are practically integral and, together with the copper oxid plate 6, form the negative electrode and hence the connecting wire 18 may be soldered or fastened to the cell as at 19.

For the exciting fluid a solution of caustic soda, caustic potash or other suitable electrolyte may be used, and as the top of my cell is welded to the jar, it is necessary to provide means for introducing the exciting fluid. A hole is made in the top 11 at 20 in which may be secured a tube 21 of suitable material, but preferably of hard rubber to prevent short circuits outside of the containing case. As a vent is necessary to allow the escape of hydrogen or other gas liberated when the battery is in action, the screw cap 22 on the end of the tube 21 is provided with a hole 23 for the purpose. To retain the copper oxid plate 6 in proper relation to the zinc plates 12, the U-shaped piece of insulating material 24 is inserted between the plates as shown. When the battery is likely to receive very rough usage, the U-shaped piece 24 may be made of soft rubber to serve as an additional shock absorber.

As my improved cells of sheet steel or iron are likely to be indented if unprotected, and as they are seldom used singly, I shall now describe my method of assembling a plurality of cells to form a substantial commercial battery. The cells, two, four, six or any desired number, may be assembled in a protecting and carrying case 25 which may be of wood or other suitable material, in which the sheet metal cells are placed and separated from each other and from the case; the space below, above and all about and between the cells being filled with an asphaltum or petroleum product, or some suitable mixture thereof, as shown at 26 in Fig. 1. The mixture is poured in warm and allowed to cool and harden, thus forming a liquid proof inclosure for each cell and for the entire battery, thoroughly protecting the same. It will be noted that the asphaltum mixture is allowed to flow over the tops 11 of the cells and about the washers 17, nuts 15 and the bottoms of the tubes so as to seal and retain all securely in place. The battery box 25 is covered by the lid 27, which may be secured in any suitable manner, as by screws 28. Suitable holes 29 are made in the lid 27 for the passage of the cell filling and vent tubes 21. The bottom 2 of each cell is covered with a thin layer 31 of the asphaltum mixture or other material, to prevent any broken zincs from contacting with the bottom of the cell. The interior walls 1 of the cell, may also be so covered if found desirable. The battery box 25 is provided with a carrying handle 30 of leather or other suitable material and secured to the box in any suitable manner. Binding posts or other means (not shown) to which the battery cells are properly connected, may be secured to the lid 27 for attaching the service wires leading to the spark coil or other appliance with which it is desired to use the battery.

The cell jars or cans may be put together in any suitable manner. In the modification shown in Fig. 4, the top 36 and bottom 37 overlap the cell body 38 and are welded on the outside thereof. The strip 3 is shown as attached to the bottom 37 and cell body 38 in a different manner from that shown in Fig. 1. The lateral flanges 29 extending across the bottom 37 are welded with the bottom to the body 38. In Fig. 4 is also shown a substitute for the U-shaped holder or buffer 24, which here consists of the U-shaped metal clip 40, bolted or riveted to the zinc connector 13, the ends thereof being covered with rubber tubing 41 or other insulating material. This form may be used if more resilience of the parts is desired. A modified construction for the filling and vent tube is also shown. In this construction, a short tube 42 is welded or soldered to the top 36 over the hole 20 and a piece of hard rubber tubing 43 is slipped over the tube 42 and held in place by the tin screw outlet piece 44, secured to the wood top 27 by the prongs 45, integral with the outlet piece 44. The outlet is closed by the screw cap 46, which is provided with the vent holes 47.

Other modifications of the details of construction may be employed, therefore, I do not wish to be limited to the structures here shown and described.

I claim:

1. In a battery cell, the combination of an inclosed metallic jar, positive and negative elements inclosed therein, means for resiliently securing one of said elements to the bottom of said cell and separate means for resiliently securing the other element to the top of said cell.

2. A battery cell provided with positive and negative elements, an exciting fluid, and means for resiliently securing the elements to said cell, one of said elements being secured and electrically bonded to the bottom of said cell and the other suspended from the top of said cell and insulated therefrom.

3. A battery cell comprising an inclosed metal jar serving as one pole of the cell, a resilient support for one of the elements secured to said jar and electrically bonded thereto and an element of opposite polarity resiliently secured to the top of said jar and insulated therefrom.

4. A battery cell provided with positive and negative elements, resilient means for securing the elements to said cell, one of said elements being electrically bonded to and the other insulated from said cell and an exciting fluid surrounding both elements and submerging one of them.

5. A battery cell comprising an inclosed sheet metal jar, a resilient support secured to the bottom of said jar, a copper oxid plate mounted on said support and serving as one of the elements of said cell, an element of opposite polarity resiliently suspended from the top of said jar and a suitable exciting fluid therefor.

6. A battery cell jar comprising a sheet metal body section, a bottom section and a top section welded together and a resilient metal support welded to the bottom of said jar.

7. A battery cell comprising an inclosed sheet steel jar provided with a body section, a bottom section and a top section welded together, a resilient sheet metal support welded to the bottom of said jar, a copper oxid plate means for securing the same to said support and zinc plates resiliently suspended from the top of said jar and insulated therefrom.

8. In a battery cell, the combination of an inclosed sheet metal jar, interleaved positive and negative elements, said elements being resiliently secured one to the top of said jar and the other to the bottom of said jar and an insulating buffer secured to one of said elements and embracing the other element for preventing contact and excessive vibration of the same.

9. In a battery cell, the combination of an inclosed sheet metal jar, positive and negative elements resiliently secured thereto and an insulating material covering the inside surface of the bottom and lower part of the jar for the purpose specified.

10. A battery comprising a plurality of cells each provided with a positive and negative element, an exciting fluid, and means for resiliently securing the elements to said cell, one of said elements being secured and electrically bonded to the bottom of said cell and the other element suspended from the top of said cell and insulated therefrom, said plurality of cells being spaced apart, and secured in a carrying case by embedding and covering the cells with a pitchlike substance for sealing, insulating and protecting the same.

11. A battery comprising a plurality of cells each consisting of an inclosed metal jar serving as one pole of the cell, a resilient support for one of the elements secured to said jar and electrically bonded thereto, and another element of opposite polarity secured to the top of the jar and insulated therefrom, said plurality of cells secured in a carrying case and spaced apart from each other, a pitchlike substance surrounding and inclosing said plurality of cells, whereby said cells are sealed, insulated and protected from external injury.

12. A battery comprising a plurality of cells each consisting of a sheet metal body section, a bottom section and a top section welded together, and a resilient metal support welded to the bottom of said jar, a copper oxid plate means for securing the same to said support and zinc plates resiliently suspended from the top of said jar and insulated therefrom, said plurality of cells being mounted in a case and surrounded and covered by a pitchlike substance for insulating and protecting said cells.

This specification signed and witnessed this 5th day of April 1909.

WILLIAM M. BRODIE.

Witnesses:
LOUIS M. SANDERS,
C. A. ALLISTON.